United States Patent
Krivosheev et al.

(10) Patent No.: US 9,551,212 B2
(45) Date of Patent: Jan. 24, 2017

(54) METHOD FOR DETERMINING A POSITION OF A WATER/CEMENT BOUNDARY BETWEEN PIPES IN A HYDROCARBON WELL

(71) Applicant: FMC Kongsberg Subsea AS, Kongsberg (NO)

(72) Inventors: Sergey Ivanovich Krivosheev, St. Petersburg (RU); Evgeni Lvovich Svechnikov, St. Petersburg (RU); Georgy Petrovich Zhabko, St. Petersburg (RU); Andrey Aleksandrovich Belov, St. Petersburg (RU); Yuri Eduardovich Adamian, Pos. Kuzmolovski Leningradskaya obl. (RU)

(73) Assignee: FMC Kongsberg Subsea AS, Kongsberg (NO)

( * ) Notice: Subject to any disclaimer, the term of this patent is extended or adjusted under 35 U.S.C. 154(b) by 0 days.

(21) Appl. No.: 14/773,339

(22) PCT Filed: Mar. 15, 2013

(86) PCT No.: PCT/EP2013/055407
§ 371 (c)(1),
(2) Date: Sep. 5, 2015

(87) PCT Pub. No.: WO2014/139585
PCT Pub. Date: Sep. 18, 2014

(65) Prior Publication Data
US 2016/0017705 A1 Jan. 21, 2016

(51) Int. Cl.
*G01V 1/40* (2006.01)
*G01V 3/30* (2006.01)
(Continued)

(52) U.S. Cl.
CPC ......... *E21B 47/091* (2013.01); *E21B 47/0005* (2013.01); *G01V 1/02* (2013.01);
(Continued)

(58) Field of Classification Search
CPC .............................. G01V 1/50; E21B 47/0005
(Continued)

(56) References Cited

U.S. PATENT DOCUMENTS

| 3,752,257 A | 8/1973 | Davis |
| 5,047,992 A * | 9/1991 | Howlett ................... B06B 1/04 181/106 |

(Continued)

FOREIGN PATENT DOCUMENTS

| EP | 0 837 217 A2 | 4/1998 |
| GB | 2 292 801 A | 3/1996 |

(Continued)

*Primary Examiner* — Ian J Lobo (57) ABSTRACT

A method has been disclosed for determining a position of a water/cement boundary in an annular area between two concentric pipes in a hydrocarbon well. The method comprises the steps of running a well tool (10) into a central pipe of the well, where the well tool (10) comprises a tool housing (11), a pulse generator (14) and a signal recorder (16) provided within the housing (11); generating an electromagnetic pulse by means of the pulse generator, thereby providing physical vibrations in the central pipe of the well; recording reflected acoustic signals from the well by means of the signal recorder (16); repeating the generating and recording steps for different vertical positions of the pulse generator in the well; organizing the recorded signals in a two-dimensional representation; filtering the organized recorded signals in order to identify, in the two-dimensional representation, a hyperbola (B); and providing an apex of the hyperbola (B) as the determined position of the water/cement boundary.

7 Claims, 7 Drawing Sheets

(51) Int. Cl.
*G01V 1/50* (2006.01)
*E21B 47/09* (2012.01)
*E21B 47/00* (2012.01)
*G01V 1/02* (2006.01)
*G01V 1/44* (2006.01)

(52) U.S. Cl.
CPC .................. *G01V 1/44* (2013.01); *G01V 3/30* (2013.01); *G01V 1/50* (2013.01)

(58) Field of Classification Search
USPC ............. 367/35; 181/105; 166/253.1, 250.03
See application file for complete search history.

(56) References Cited

U.S. PATENT DOCUMENTS

| | | |
|---|---|---|
| 5,274,604 A | 12/1993 | D'Angelo et al. |
| 6,595,285 B2 | 7/2003 | Dubois et al. |
| 2005/0205248 A1* | 9/2005 | Barolak .................. E21B 47/16 166/66.5 |
| 2009/0231954 A1 | 9/2009 | Bolshakov et al. |

FOREIGN PATENT DOCUMENTS

| | | |
|---|---|---|
| WO | 2011/117355 A2 | 9/2011 |
| WO | 2014/189497 A1 | 11/2014 |

\* cited by examiner

METHOD FOR DETERMINING A POSITION OF A WATER/CEMENT BOUNDARY BETWEEN PIPES IN A HYDROCARBON WELL

FIELD OF THE INVENTION

The present invention relates to a method for determining a position of a water/cement boundary in an annular area between two concentric pipes in a hydrocarbon well.

BACKGROUND OF THE INVENTION

Cavities are often filled with a material for insulation or other purposes. In one instance this can for example be a tank with double walls where the cavity between the walls is filled with cement or other hardening material. In another instance it can be a special purpose building, for example a power station having walls where the cavity is filled with cement. Sometimes it may be necessary to ascertain the quality of the filling where there are difficulties doing so due to inaccessibility or safety reasons.

One typical example of such a cavity is the annular space between the casing strings of a hydrocarbon well. A typical hydrocarbon well construction consists of a number of coaxial pipes called casing strings that are successively installed in the well as the drilling progresses. Normally, the first pipe (i.e., the conductor pipe) is set in the well by being bonded to the surrounding formation with cement that is pumped down the pipe and allowed to flow up in the space between the conductor pipe and the surrounding ground. Then, after drilling further down a second casing normally called a surface casing is installed in the well and again the casing is set by filling the annular space between the pipe and the borehole and conductor pipe with cement. Then, depending on the length of the hole drilled and the rock structure, successive casing strings with diminishing diameters are introduced into the borehole and hung off from the wellhead. These casings are normally cemented only partway up from the bottom of the borehole. Lastly, production tubing is installed into the well down to the producing formation and the casings are perforated to allow fluids to enter the well and flow up through the tubing and the Christmas tree and into a flowline.

When cementing each pipe the normal practice is to calculate the amount of cement needed, based on the annular space and the length of the space designed to be filled. However, it is often difficult to calculate the exact amount of cement needed, and the cement level may be lower than intended. In the case of surface casing it is desirable to fill the annular space all the way up to the mudline (i.e., the seabed), but this may not always be achieved, leading to so-called cement shortfall. The top of the surface casing may therefore be filled with a fluid (e.g., water or brine) instead of cement resulting in the surface casing string not being bonded to the conductor pipe all the way up to the mudline. In such a case the part of the surface casing that is not cemented can be regarded as a free-standing column that, if subjected to loads, can be damaged.

The surface casing carries a wellhead and is the principal load-carrying structure for the equipment mounted on top of the wellhead. It serves both the purpose of being a foundation for external loads, such as production equipment (e.g., the Christmas tree) and for borehole support against the formation. A well will be subjected to various loads during its lifetime. In for example a workover situation, a BOP and riser are attached to the Christmas tree, with the riser extending to the surface. The movements of the riser and the use of drilling equipment can set up cyclic loads in the wellhead and the surface casing string (See FIG. 1). This may induce fatigue in the casing string.

Another cause of loads comes from the casing strings being subjected to loads from being heated by the producing fluids.

If the cement has filled the annular space completely and, in addition, has bonded properly with the steel pipe, cyclic loads will be spread along the length of be casing and transferred to the conductor pipe and the ground. However, if there is a length that has not been properly filled, that part of casing can act as a free-standing column (as described above) and cyclic loads can lead to fatigue and damage of the casing. It is also possible that the point at the top of cement level can act as a breaking point because of the movements of the column above.

Similarly, heating and cooling of the casing may induce loads that can lead to fatigue problems and deformation of the casing.

As can be understood from the above, it is therefore of prime interest to find out if the cement job is properly executed, i.e., if the annular space is properly filled. The main purpose of the invention is therefore to find he level of the cement from which the length of the column can be determined.

If later work has to be performed on the well, the BOP and riser are reattached to the Christmas tree so that operations can be carried out in a safe manner.

Both during drilling and (if necessary) workover operations the wellhead is subjected to external loads, as explained above. How this affects the wellhead depends on the length of the free standing column. A longer column will be more vulnerable to fatigue. If the length of the free standing column can be determined, how much load the wellhead can be subjected to can be calculated and this will in turn determine how much work can be done. This enables an operator to predict the operational lifetime of the well and to ensure the integrity of the well structure.

One method for non-destructive logging of layers of different materials comprises the creation of a magnetic pulse within a pipe to cause the pipe to act as an acoustic transmitter. One such example is disclosed in U.S. Pat. No. 6,595,285, which describes a method and device for emitting radial seismic waves using electromagnetic induction to generate a magnetic pressure pulse that causes a distortion within a pipe and which utilizes the elastic restoring property of the pipe to cause it to become an acoustic transmitting device. This can be used for generating seismic waves in the subsoil. In U.S. Pat. No. 3,752,257 a similar device is located within a conductor pipe and used to measure acoustic velocity within a formation. The acoustic signals are reflected from the formation and recorded by two receivers and the delta travel time between the receivers is recorded. It is also stated that this apparatus can be used to measure the quality of the cement bond between the conductor pipe and the earth formation. However, there is no further explanation on how this may be achieved, and the inventors have found that this is not a reliable way of determining the cement level.

In both these examples of the known art the transmitter is located such that the acoustic waves only have to traverse one pipe wall, e.g., the conductor pipe. If the device is to be located in a fully completed well there is the challenge of creating a signal that is both strong enough to penetrate through several different casing pipes and be able to distinguish between the reflected signals from the various casings.

In WO 2011/117355 belonging to the applicant, this problem is addressed by using a signal of very short duration. Because of the short duration of the signal it is possible to separate the reflections on a time lapse basis. The speed of the acoustic waves is different in cement (i.e., a solid) than in water. When transmitting signals at various points in the well it will be possible to find the spot where the signal is different. This, in theory, marks the exact location of the top of the level of cement.

In addition to the problem of separating the various reflections from each other, there is also the problem with signal noise. This can be signal noise generated by the system itself, but also second and third reflections from the various casings. The latter of course becomes even more complicated when the reflected signal comes from an annulus that is several layers away from the receiver, as is the case of the annulus between the conductor and the surface casing, which is known in the art as the "D" annulus. Both the transmitted and the reflected signal must in this case pass through four casing pipes. There may also be reflected signals travelling along the pipe that also can produce noise.

In view of the above background, there is a need for an improved method for determining a position of a water/cement boundary in an annular area between two concentric pipes in a hydrocarbon well.

SUMMARY OF THE INVENTION

The invention relates to a method for determining a position of a water/cement boundary in an annular area between two concentric pipes in a hydrocarbon well, as set forth in the appended independent claim 1.

Advantageous embodiments have been set forth in the dependent claims.

BRIEF DESCRIPTION OF THE DRAWINGS

In the following, embodiments of the invention will be described in detail with reference to the enclosed drawings, where.

DETAILED DESCRIPTION OF THE INVENTION

Figure 1:
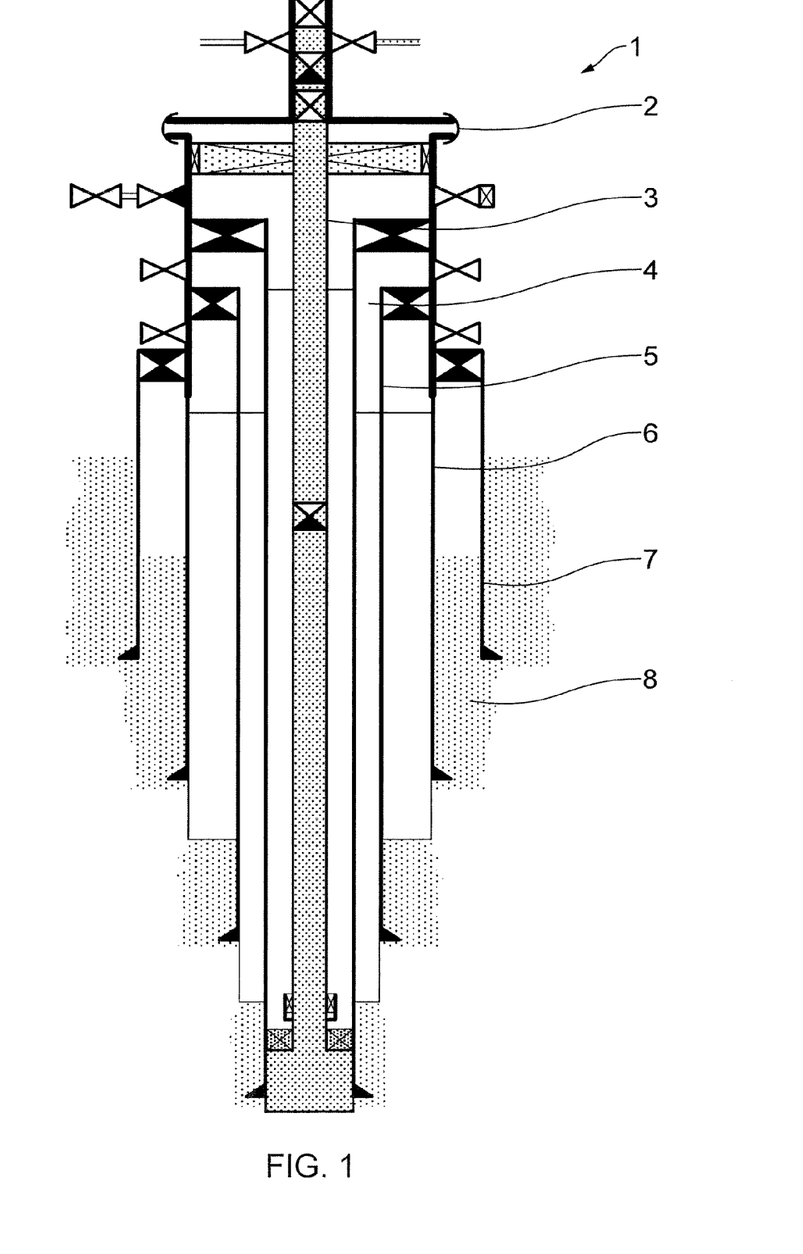
FIG. 1 is a simplified sketch of a completed well supported by the seabed.

In FIG. 1 there is shown an illustrative embodiment of a completed hydrocarbon well 1. The well is completed with a wellhead 2, a production tubing 3, a first intermediate casing 4, a second intermediate casing 5, a surface casing 6 and a conductor casing 7. The annulus between the surface casing 6 and the conductor 7 is shown filled with cement 8.

Cement is normally provided between the drilled hole and the conductor casing and between the conductor casing and the surface casing. As mentioned above the annular space between the conductor casing and the surface casing should ideally be filled with cement all the way to the wellhead. The annular spaces between the other casings are normally only filled partway up from the bottom with cement, the amount determined by the formation characteristics. It should be noted that more than these casings may be used for the foundation of the well, depending on the seabed properties, etc. The top end of the production tubing is connected to a tubing hanger that in turn is anchored in the well head or Christmas tree (depending on the type of completion) while its lower end is fastened in the first casing with a production packer, as is well known in the art.

Figure 2:
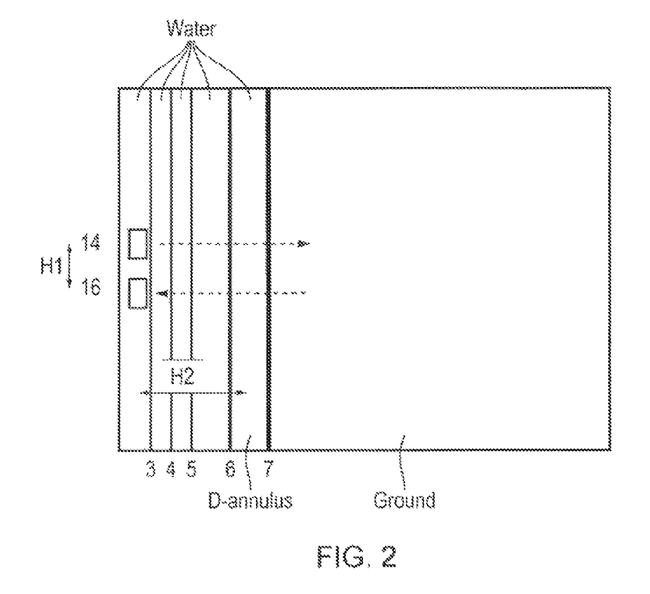
FIG. 2 is a partial illustration of the well of FIG. 1, schematically showing a well tool for use in the method of the present invention located in the production tubing.

In FIG. 2 there is shown a part of the well in vertical section showing the casing strings and with the position of the pulse generator 14 and receiver 16 indicated inside the production tubing 3. There are also lines indicating the signals going from the pulse generator and being reflected back to the receiver.

Figure 3:
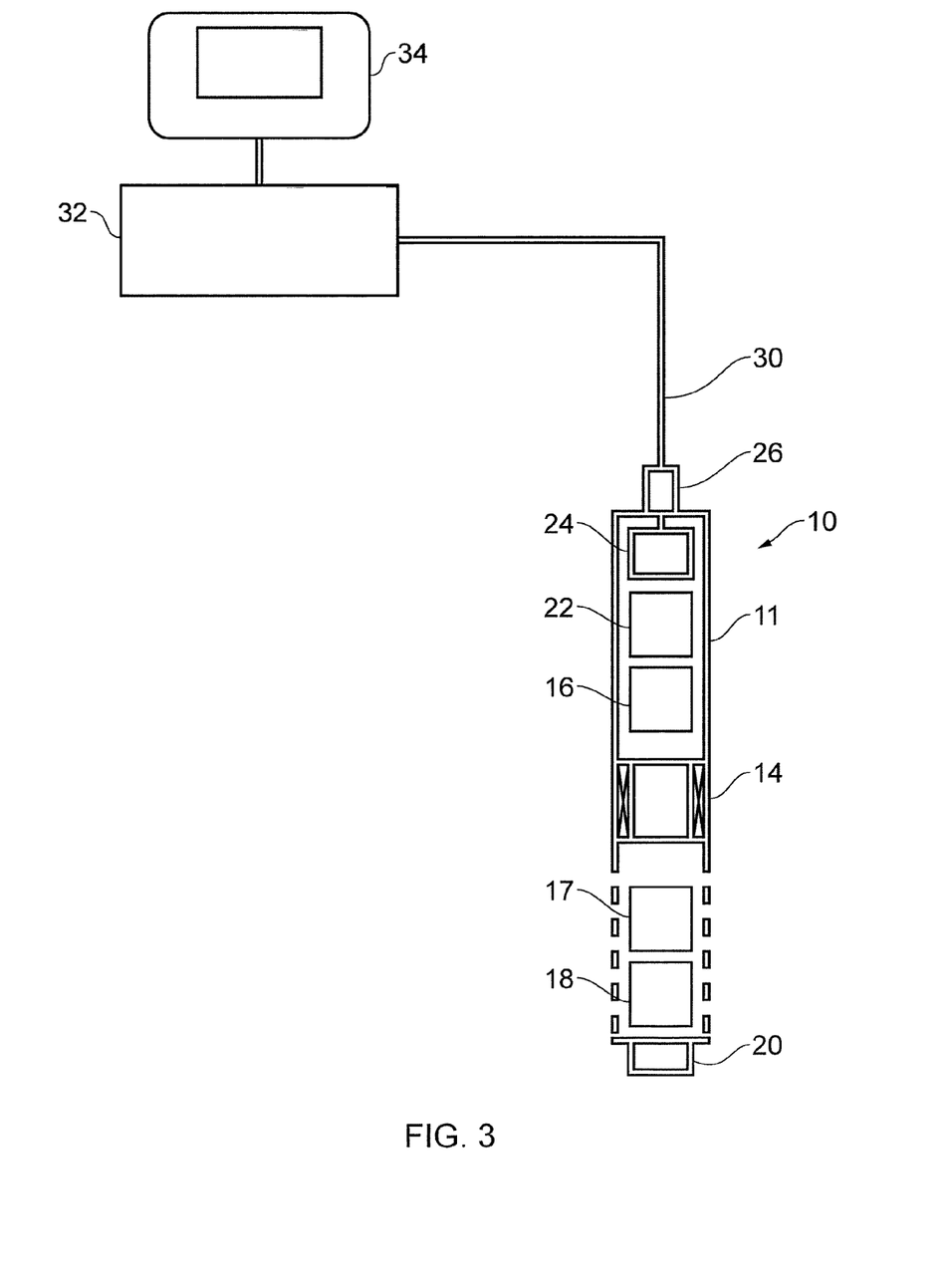
FIG. 3 is an illustration of the well tool according to the invention.

In FIG. 3 there is shown a sketch of the well tool 10. The tool 10 comprises a tool housing 11 and a pulse generator 14 for generating an electromagnetic pulse, which due to the magnetic properties of the pipe will cause the pipe to oscillate.

In an aspect of the invention the well tool 10 is intended to be used in a well pipe. The tool 10 comprises a housing 11 and a pulse generator 14 which is provided within the housing 11.

Figure 4:
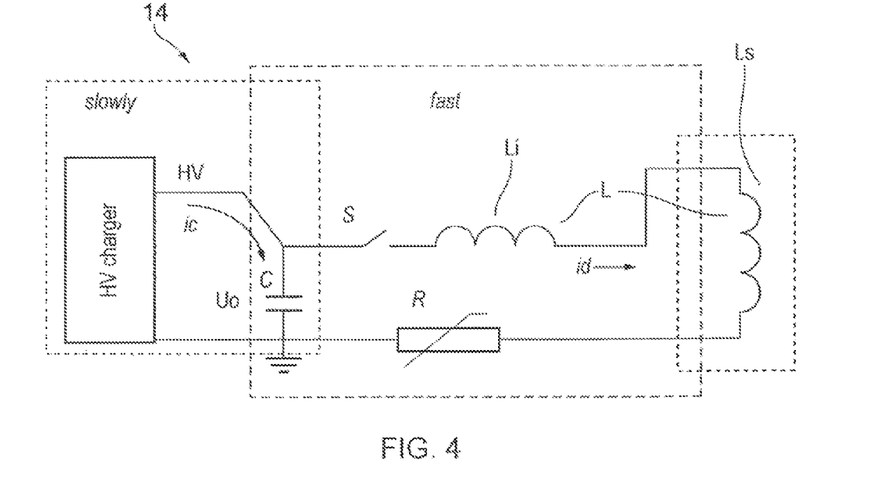
FIG. 4 is a schematic diagram of an induction coil of the well tool with its associated circuitry.

The pulse generator 14 comprises an inductor Ls and a power supply device HV, c, which in use supplies electrical power to the inductor Ls to thereby generate an electromagnetic pulse. The tool and the well pipe are arranged in such a way that the electromagnetic pulse provides physical vibrations in the well pipe. To this end, the well pipe may be made, at least partly, of a magnetic material. The inductor may comprise a metallic core, e.g. a cylinder.

In an aspect of the invention, the cross sectional gap area of an annular gap between an outside of the inductor Ls and an inner surface of the well pipe, which is referred to herein as Agap, is substantially equal to an inner cross sectional area of the inductor Ls, which is referred to herein as Ainner. In this context, "substantially equal" may, e.g. mean that the ratio between the cross sectional gap area Agap and the inner cross sectional area Ainner is in the range 0.7 to 1.3. More advantageously, the area ratio may be in the range 0.9 to 1.1, and even more advantageously, the area ratio may be in the range 0.95 to 1.05.

Particularly advantageously, the cross sectional gap area Agap is equal to the inner cross sectional area Ainner.

The well tool 10 may advantageously comprise a centralizing device (not shown) which is configured to position the well tool 10 in a central position within the well pipe.

The inductor Ls may advantageously have an inductance in the range of $10*10^{-6}$ H to $40*10^{-6}$ H.

The power supply device may advantageously comprise a capacitor c connected to the inductor Ls, wherein the capacitor c is configured to discharge its energy over the inductor. Also, the power supply device may comprise a switch s connected between the inductor Ls and the capacitor c.

In another aspect of the invention the well tool 10 is provided for determining or measuring the presence or absence of cement in an annular area between two concentric pipes in a hydrocarbon well. In such an aspect the well tool comprises a tool housing 11, a pulse generator 14 provided within the tool housing 11 for generating a magnetic field, where the pulse generator 14 comprises an inductor Ls, and a power supply device HV, c for supplying electrical power to the inductor Ls to thereby cause an electromagnetic pulse to be generated in such a way that the electromagnetic pulse provides physical vibrations in the pipe being closest to the pulse generator 14.

In such an aspect the well tool further comprises at least one signal receiver or recorder 16 provided within the tool housing 11 for recording reflected acoustic signals from the well. Further, a first distance H1 between the signal recorder 16 and the pulse generator 14 is substantially equal to a second distance H2 between the pulse generator 14 and the annular area. In this context, "substantially equal" may, e.g., mean that the ratio between the first distance H1 and the second distance H2 is in the range 0.7 to 1.3. More advantageously, the distance ratio may be in the range 0.9 to 1.1, and even more advantageously, the distance ratio may be in the range 0.95 to 1.05.

Particularly advantageously, the first distance H1 and the second distance H2 are equal.

Advantageously, the well tool 10 may comprise a centralizing device which is configured to position the tool 10 in a central position within the well pipe. The second distance H2 may advantageously be measured in a radial direction in relation to the well from the center axis of the inductor Ls to the center of the annular area.

The well tool 10 may advantageously be provided in the innermost pipe of the well.

The pulse generator 14 may, e.g., be located at a distance H1 of between 10 cm and 20 cm from the signal recorder 16.

Advantageously, the well tool 10 may comprise an ultrasonic absorber (not shown) located between the pulse generator 14 and the signal recorder 16.

In a particular aspect of the invention, the signal recorder may be located above the pulse generator. In this particular aspect, a second signal recorder may also be arranged, and in particular, it may be located in dose proximity to the first signal recorder.

Additionally, a third signal recorder may also be arranged, and in particular, it may be located below the pulse generator, at the distance substantially equal to, or equal to, H1 below the pulse generator.

In any of the mentioned aspects, the tool 10 may thus comprise signal recorder(s) 16, 17, 18 for recording signals representing the vibrations being reflected back from the pipes in the well. Since acoustic signals are involved, a preferred signal recorder may be a hydrophone. The tool 10 may be held in a central position by centralizers (not shown). The pulse generator 14 and the signal recorder(s) 16, 17, 18 are provided within the housing 11.

The pulse generator 14 is housed within the tool 10 that may further comprise a power supply and charging device 22 and a data storage system 24. Further, the tool may comprise a cable head 26 for attaching the tool to a cable 30. The cable 30 may provide communication between the tool and surface equipment that may, e.g., comprise a first control unit 32 for the control of the tool and a second control unit 34 for receiving and processing data from the tool.

A sound absorber (not shown) may be located between the pulse generator 14 and the signal recorder(s) and may be used to prevent acoustic pulses from the inductor from reaching the signal recorder and creating noise in the system. The tool may be coupled to a tractor 20 or similar device for moving the tool in the well.

In FIG. 3 three signal recorders are shown. However, there may be only one signal recorder located above or below the pulse generator or there may be one located above and one located below. In a preferred embodiment there is only one signal recorder which preferably is located above the pulse generator.

The distance between the pulse generator 14 and the signal receiver 16 in relation to the distance to the target may have significant effect. As shown in FIG. 2, the outward waves travel outwards to the D annulus and get reflected back as acoustic waves to the signal recorder. As mentioned above, the distances involved are very small. The standard nominal diameter of a surface casing is 20 inches (50 cm), and a normal size for the conductor casing is 30 inches (75 cm). If we regard the center of the well as the datum, the signals will only have traveled 25 cm-35 cm before they reach the surface casing and the conductor pipe. In FIG. 2, the distance H1 between the pulse generator 14 and the closest signal receiver 16 is indicated. Moreover, the distance H2 between the pulse generator 14 and the D annulus is indicated. More specifically, the distance H2 indicates the horizontal distance between the center axis of the pulse generator 14 and the center of the D annulus.

As is known in the art, see for example FIG. 10 in U.S. Pat. No. 6,595,285, it may be desirable to have a large distance between the pulse generator and the signal recorder. This is no problem when doing seismic surveys since the signals may travel several thousand meters. However, in the confined circumstances in a well and with many scattered $3^{rd}$, $4^{th}$ or even higher reflected signals, the separation becomes very important. This technology would not give satisfying results in the confined environment of a well.

The applicant has found that a particularly advantageous result is obtained when the distance H1 between the pulse generator and the signal recorder is substantially equal to, or equal to, the distance H2 between the pulse generator and the annulus being analyzed.

Based on the abovementioned exemplary dimensioning, that means that the signal recorder should be located about 30 cm from the pulse generator when the D annulus is analyzed. But a small deviation from this is possible, so between 20 cm and 40 cm will still able a good separation of reflected signals. In the case of signal recorders both above and below the pulse generator they should both be the same distance (H1) from the pulse generator. In the case of two signal recorders located below the pulse generator (as shown in FIG. 3) they are preferably placed as close to each other as possible. Arrangements with several signal recorders enable recordings to be compared with each other and can be used to check for anomalies or to find (and eliminate) noise. Another use for several signal recorders is as backup in case of failure of one of them.

In FIG. 4 there is shown a schematic drawing of a preferred embodiment of the pulse generator. The pulse generator 14 comprises a charging device, for example a high voltage power supply HV, for charging an energy storage device, for example a capacitor C. The capacitor C is connected in series with a switching device S, at least one inductor L and a resistor device R. In FIG. 4, the at least one inductor L is represented by a first inductor Ls and a second inductor Li. The second inductor Li is shown only to illustrate self inductance, i.e., the internal inductance in the pulse generator 14.

Initially, the switch is turned off. The voltage Uo is applied by the high voltage power supply HV to the capacitor C for charging the capacitor. When fully charged, the switch is turned on, and the capacitor C will discharge by supplying a current l through the inductor Ls and the resistor R. The current through the magnetic inductor Ls generates the electromagnetic signal pulse which will result in mechanical action on the pipes in the well. These mechanical stress waves are transmitted outwards as acoustic waves which are then reflected back to the tool as the waves hit the boundaries.

Figure 5:
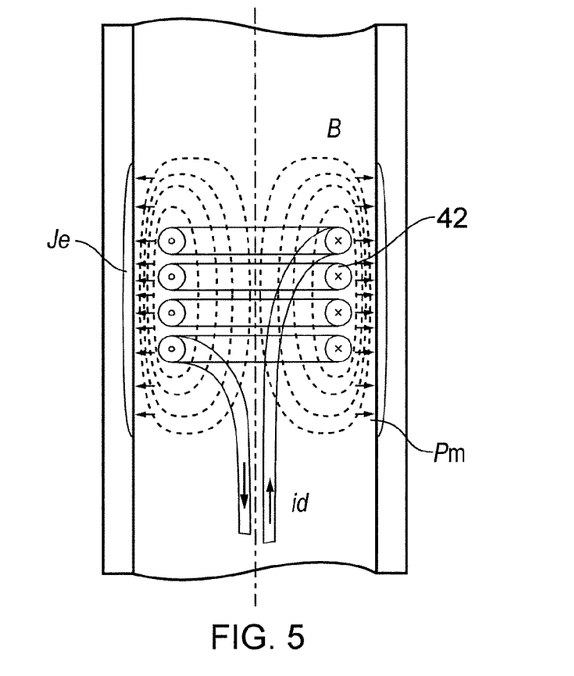
FIG. 5 is a schematic view of an induction coil and accompanying field lines.
Figure 6:
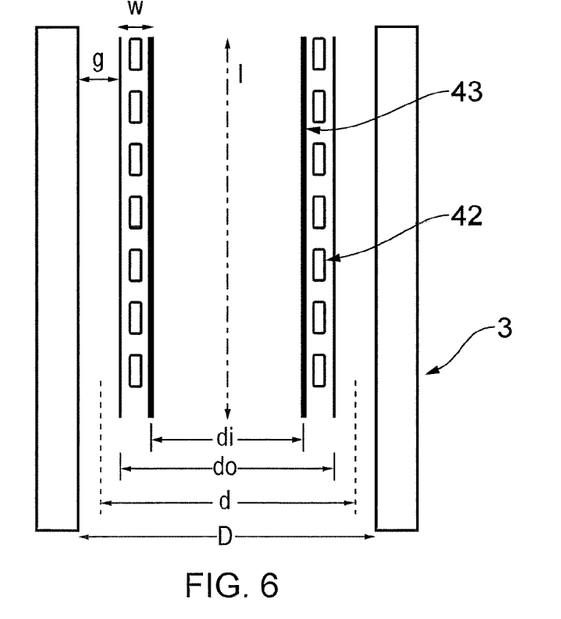
FIG. 6 is a schematic view of an induction coil according to the present invention.

An illustrative example of the inductor Ls is shown in FIGS. 5 and 6. The inductor comprises a coil 42 with a number of turns, where the number of turns determines the electromagnetic discharge characteristics. A supporting sleeve 43 (shown in FIG. 6) may be arranged to support the coil 42 during use and also during production of the coil. When current passes through the inductor Ls it will produce a magnetic field as shown in the FIG. 5.

The requirements of the elements of the pulse generator 14 will depend on the desired parameters of the generated electromagnetic pulse and the characteristics of the system it is being used in.

Inductance results from the magnetic field forming around a current-carrying conductor. Electric current through the conductor creates a magnet flux proportional to the current. A change in this current creates a corresponding change in magnetic flux which, in turn, by Faraday's law generates an electromotive force (EMF) in the conductor that opposes this change in current. Thus, inductors oppose changes in current through them. Inductance is a measure of the amount of EMF generated per unit change in current. For example, an inductor with an inductance of 1 Henry produces an EMF of 1 volt when the current through the inductor changes at the rate of 1 ampere per second. It is this electromotive force that is exploited in the invention. When the inductor is placed within a pipe having magnetic properties, the magnetic pressure from the inductor is converted into a mechanical pressure that sets the pipe in motion, as shown in FIG. 5.

The number of loops, the size of each loop, and the material the coil is wrapped around may all affect the inductance. An inductor is usually constructed as a coil of conducting material, typically copper wire, wrapped around a core either of air or of a ferromagnetic or non-ferromagnetic material. When current is delivered through the inductor, magnetic field lines will form around the coil as shown in FIG. 4.

The inductance (in Henry) is presented by the general formula for a type of induction coil called an "air core coil".

$$L = \frac{\mu_0 K N^2 A}{l}$$

where:
L=inductance in Henry (H)
$\mu_0$=permeability of free space=$4\pi \times 10^{-7}$ H/m
K=Nagaoka coefficient
N=number of turns
A=area of cross-section of the coil in square meters (m$^2$)
l=length of coil in meters (m).

The present invention may, in an exemplary aspect, use an "air core coil" that does not use a magnetic core made of a ferromagnetic material. The term also refers to coils wound on plastic, ceramic, or other nonmagnetic forms. Air core coils have lower inductance than ferromagnetic core coils. If the coil is not placed into a conductive pipe the field lines inside the inductor will be closer together and therefore the field will be stronger on the inside than on the outside. This kind of coil directs the magnetic pressure outwards, i.e., the magnetic pressure acts to the inductor extending it in a radial direction.

When the inductor is placed within a conductive screen, e.g., a metal pipe such as tubing, the field in the gap between the inductor and the pipe will be much stronger than inside the inductor. This effect will depend on the size of the gap and will be strongest when the gap is small. The magnetic pressure then acts to the inductor compressing it in the radial direction.

When the coil is placed within a conductive pipe the general formula can also be expressed thus:

$$L = \frac{\mu N^2 g \pi d}{l}$$

where:
N=number of turns
g=gap between coil and pipe
d=median diameter of coil (see FIG. 6).
We have also the following possible parameters:
do=outer diameter of coil
  this can also be expressed as D−2g where D is the inner diameter of the pipe
di=inner diameter of coil, representing the magnetic air gap inside the coil
  this can be expressed as D−2(g−w), where 2w is the difference between the outer diameter do and the inner diameter di of the coil
l=length of coil in meters.

Parameters g, d and l are exemplarily illustrated in FIG. 6. In FIG. 6, the housing 11 of the tool has been removed for clarity and ease of understanding.

The inventors have found that particularly advantageous result for limiting noise in the recorded signals depends on the position of the first inductor Ls and also on the size of the inductor Ls in relation to the conductive pipe. This is realized when the cross sectional area of the annular gap area around the coil is equal to the cross sectional area of the inductor inner cross section.

In FIG. 6, the cross sectional gap area Agap can be expressed as:

$$Agap = \pi \left(\frac{D}{2}\right)^2 - \pi \left(\frac{do}{2}\right)^2$$

In FIG. 6, the cross sectional area Ainner of the inductor inner cross section can be expressed as:

$$Ainner = \pi \left(\frac{di}{2}\right)^2$$

As described above, particularly advantageous results may be achieved when Agap and Ainner are substantially equal, in the sense that has already been disclosed. Specially advantageous results may be achieved when Agap=Ainner.

In this case the field value in the gap is nearly equal to the field inside the inductor. Magnetic pressure will then act on the inductor in the radial direction equally from both sides. In this case the inductor is mechanically balanced and has minimal displacement. This results in minimal inductor acoustic emission and hence less noise in the received signals.

Such an exemplary design of the coil is illustrated in FIG. 6. The coil 42 of the first inductor Ls is here placed inside a conductive pipe which in this example is the production tubing 3. The coil may be wound around a supporting sleeve 43 of a non-conductive material. The pipe has an inner diameter D and the coil has an outer diameter do, and it can be readily understood that D−do=2 g, where g is the gap between the outer side of the inductor and the inner side of the pipe 3. The length of the inductor is l.

In an alternative embodiment a conductive (metallic) cylinder is arranged inside the coil. This will function as a balancing element, allowing equalized magnetic pressures inside and outside coil. Due to its mechanical strength it will actually not generate acoustic noise itself. In this case the gap between the coil and the pipe can be reduced, and this may result in lower energy consumption for generating a sufficiently strong magnetic field.

In use, the pulse generator is charged up, and when the switch is closed the inductor will discharge an electromagnetic pulse. The pulse will be transmitted to the pipe and set the pipe in oscillation. This oscillation exits from the pipe and propagates as pressure pulses through the layers of pipes. As it reaches each layer the pipes will be set in motion and this motion creates acoustic waves that will be reflected back and recorded by the signal recorder.

Several exemplary tests have been performed, using different values and parameters:

Voltage Uo: 3 kV-15 kV

Capacitor C: Capacitance C=10 F−100*$10^{-6}$ F

Magnetic device Ls: inductance L=10 H−40*$10^{-6}$ H

Initially, the switch S is turned off (i.e., is open). The voltage Uo is applied over the capacitor C for charging the capacitor until a voltage of 3 kV-15 kV is achieved, as mentioned above. When fully charged, the switch is turned on (i.e., is closed), and the capacitor will discharge by supplying a current l through the magnetic device Ls and the resistor R. During tests, the switch was turned on for periods between 20 μs-200 μs. Even shorter periods of 4 μs-20 μs have also been tested. This short duration is achieved by the geometry of the coil.

The current l will, with the values given above, have an amplitude value in the range of 5 kA-20 kA. The current through the magnetic device Ls will generate an electromagnetic signal pulse which will result in mechanical oscillations of the pipes in the well. During the tests, the best results were achieved with an energy of the electromagnetic signal of 0.1 kJ-3 kJ.

Figure 7:
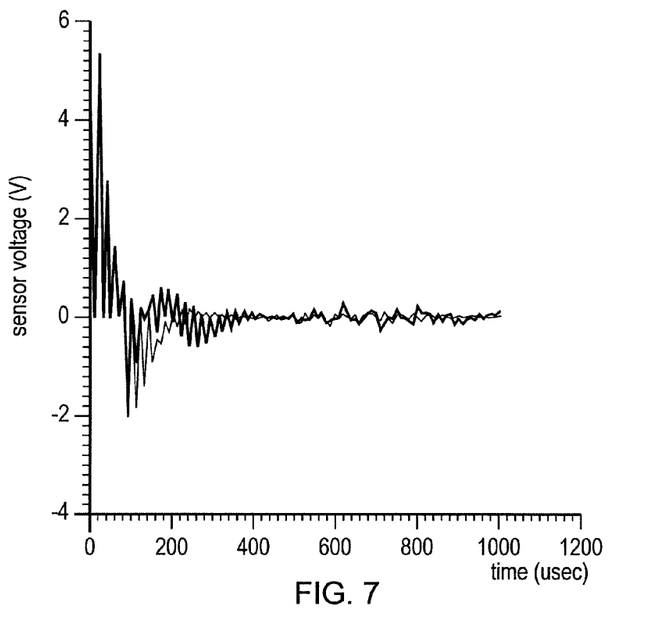
FIG. 7 illustrates a reflected signal from one pulse of the well tool.

An example of a reflected signal is shown in FIG. 7. As can be seen from this graph the reflected signals coming from the nearest pipe(s) are very strong but get progressively weaker the further away they are from the signal recorder (in the graph this is shown as response time). Therefore, reflections from the area of the "D" annulus are very weak and difficult to interpret.

It was thought that it should be possible to see from the reflected signals whether there was cement or water in the outer annulus, due to the different speed of propagation through these media. However, this has been very difficult to achieve due to the strength of the signals and the fact that the differences we were looking for are relatively small.

One possible solution to this problem was to use extremely short duration pulses. The short duration signal pulses result in shorter signals being reflected. Hence, it should be possible to distinguish the reflections from the different structures from each other. Moreover, the distance between the different structures, i.e., the diameter of the different casings, are known. Hence, it is possible to predict when the reflected wave from the different casings will return to the signal recorder, and this information may also be used to analyze the recorded signal. However, this has proved to be difficult due to the reflection from the outer annulus that is obscured by the reflections from the inner layers of the pipe system.

To determine where there is cement or where there is water the tool must be positioned at various locations in the tubing. According to the invention the tool is positioned at a point in the well a distance below the inferred cement level. The tool is then moved upwards at small intervals, preferably around 4 cm. At each position the pulse generator is activated. Each time the pulse generator is activated a signal of the type shown in FIG. 7 is recorded by the signal recorder. Data representing the acoustic reflections is recorded by means of the signal recorder. The recorded data is transferred to the analyzing device 32 for performing the analysis. The output from the analyzing device is a time-delayed signal that is depicted as lines and curves on a monitor. But for further analysis a two dimensional matrix is used where the columns represent depth of the well and each row represents the time of the returned signals. Each element will then show the strength of the signals. This matrix will be used for the subsequent 2D filtering, as discussed below.

As has been described earlier, in a completed well there may be four or even more layers of pipe between the tool and the target. This means that there are orders of magnitude of reflections from the various pipes. This makes the process of acoustic wave propagation in a system of several concentric pipes very complex. The inventors have found that there are at least three different kinds of propagation. The first kind is waves traveling in the radial direction and reflected by the layers of steel, cement and water as shown in FIG. 2. But in addition there are waves traveling along the pipe in the vertical direction and reflected from the ends of a pipe. Lastly there are waves not belonging to the above mentioned types but that are scattered at various angles and then reflected back to be picked up by the signal recorder. All this means that the differences we are looking for are relatively small. This is because we are looking for the reflection from the outer annulus that is obscured by the reflections from the inner layers of the pipe system.

A method has been provided for determining a position of a water/cement boundary in an annular area between two concentric pipes in a hydrocarbon well. The method comprises the following steps:

First, the method includes a step of running a well tool 10 into a central pipe of the well. The well tool may, e.g., be of a type which has been presented earner in the present disclosure. In particular, the well tool 10 comprises a tool housing 11, a pulse generator 14 and a signal recorder 16 provided within the housing 11.

Next, an electromagnetic pulse is generated by means of the pulse generator included in the tool housing 11 to thereby produce physical vibrations in the central pipe of the well.

Next, reflected acoustic signals from the well are recorded by means of the signal recorder 16 included in the well tool housing 11.

The two former steps of generating pulses and recording reflected acoustic signals are then repeated for different vertical positions of the pulse generator in the well.

Then the recorded signals are organized in a two-dimensional representation.

Further, the organized recorded signals are filtered in order to identify, in the two-dimensional representation, a hyperbola B.

Finally, an apex of the hyperbola B is found or identified as the determined position of the water/cement boundary in the annular area between the two concentric pipes in the hydrocarbon well.

In an aspect of the invention the method also includes computing a tip point of the hyperbola B by means of one hyperbola leg and parameters of the well pipe structure, in particular known positions of the two concentric pipes, where the tip point of the hyperbola B represents the water/cement boundary.

The two-dimensional representation in which the recorded signals are organized may in an advantageous aspect include a two-dimensional matrix of the relationship between the height, or vertical position, in the well and the time delay of the reflected acoustic signal.

Each element of the matrix may advantageously include a numerical value which represents a signal strength value of the recorded signals. More particularly, the matrix may include column positions that correspond to vertical positions in the well and row positions that correspond to acoustic time delay values.

In an aspect of the method, the pulse generating step and step of recording, for different vertical positions in the well, includes repeating those steps for vertical intervals in the range of 3 cm-10 cm.

In any of the above aspects, a filter may be used in the filtering steps to filter out signals with a direction of propagation that is perpendicular to an axis of the well tool.

Figure 8:
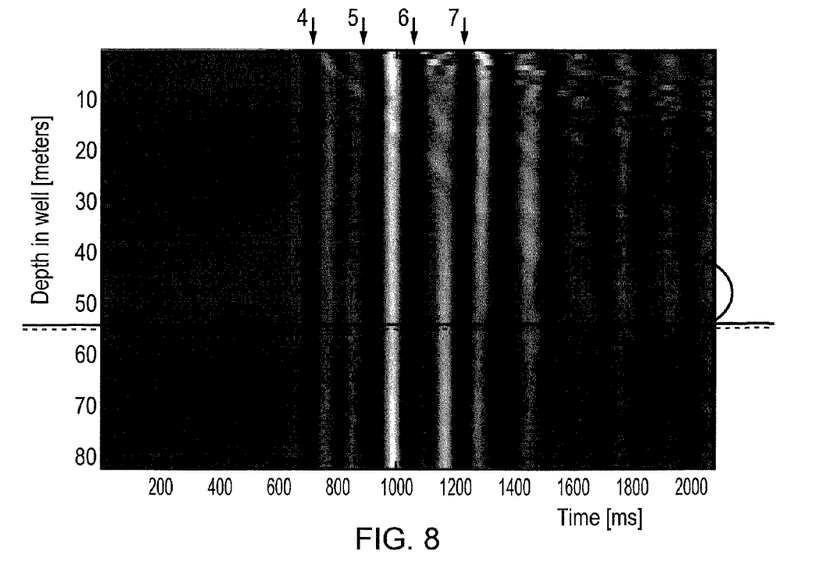
FIG. 8 illustrates a simulation of reflected signals from several pulses fired at different heights in a well.

FIG. 8 shows a diagram of reflected signals after having positioned the tool at several locations, thus representing the recorded signals from the total number of pulses. The vertical lines show the waves coming from the edges, i.e., the pipes. Since we know the strength of the signals, the speed of the acoustic waves and the dimensions of the system, we can reliably predict which lines represent which pipe. This will give us a horizontal position of the pipe of interest (e.g., the conductor or surface casing). It should be noted that in FIG. 8, the signals are from an experimental setup with a known cement/water boundary, and it was known where the cement was located (indicated by dashed line) and where the water was located (indicated by dashed circle). However, as seen in FIG. 8, it is not possible to see the difference between the signals representing water from signals representing cement. In FIG. 8, the darker lines representing the pipes 4, 5, 6 and 7 from FIG. 1 are indicated.

Acoustic signals reflected from a point source will form a hyperbola with the point source being its apex. During our experiments we have seen the same types of signals, and further investigation revealed that these signals indeed came from the area forming the top of the cement level between the conductor and the surface casing, for example the cement level in the D annulus. This has lead us to conclude that the top of the cement level can be viewed as a discontinuity that can be regarded as a point source. Our investigations has found that at least some of the signals, especially the type 2 and 3 signals, will hit this discontinuity from above and below and that these signals will be received by the signal receiver as a hyperbola.

Theoretically that should enable us to find the cement level by finding the shape of the hyperbola and then calculating the apex, and hence the cement level since the apex is in the same horizontal plane as the cement level boundary. However, while we are able to see the signals, these types of signals are extremely weak, representing about 2%-5% of the total reflections and therefore being very difficult to discern from the other signals.

To amplify the signal it is therefore necessary to filter out unwanted signals and possibly also amplify some signals to enable us to find the hyperbola. For this purpose a simulation of the well system is performed. This simulation will return an expected hyperbola based on specific well characteristics. From the simulation we measure the angle of the leg(s) of the hyperbola in relation to the horizontal plane. Then by applying 2D filtering to emphasize signals that lie along the angle returned by the simulation, the signals representing the legs of the hyperbola can be amplified and the location of the cement boundary can be found. Filter coefficients of course are specially selected to amplify the feature that we are looking for (i.e., a line with a specific inclination). It should be noted that it is normally very difficult to see the area around the apex directly since these signals are usually totally obscured by the signals from the pipe(s), as discussed below.

Figure 9:
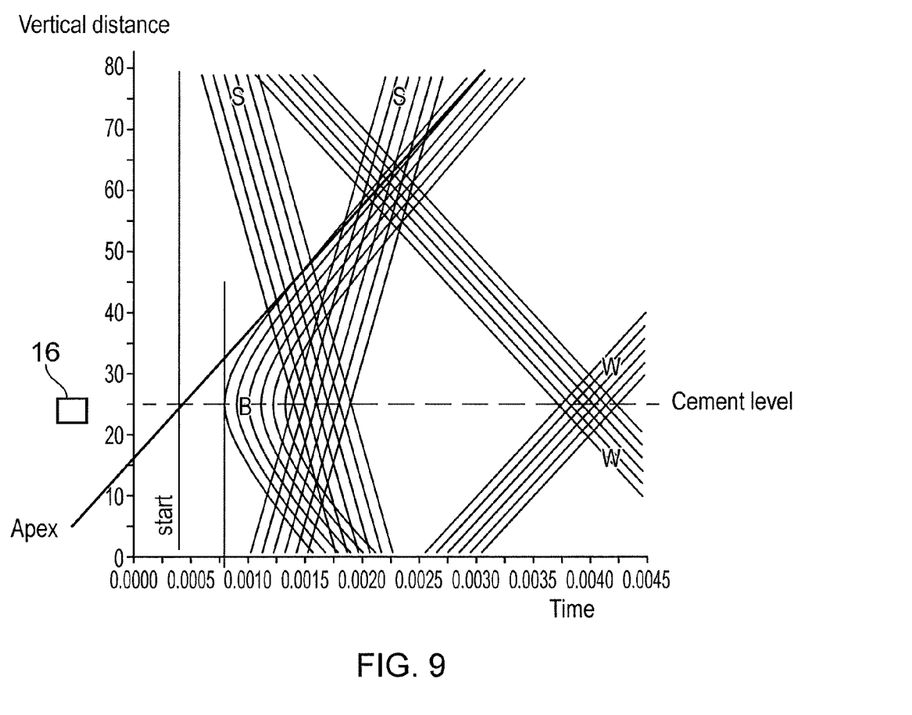
FIG. 9 illustrates theoretical waveforms at the boundary between water/cement.

The theoretical simulation may give us the hyperbolas B with a shape as indicated in FIG. 9. The apex of one of the hyperbolas B is also indicated in FIG. 9. Furthermore, S denotes steel and W denotes water. It should be observed that different well designs will return other hyperbola shapes.

The signals being reflected from below the cement level usually are much weaker than those signals being reflected from above. Under certain conditions the signals representing the lower leg of the hyperbola are so weak that they cannot be separated from the noise. And with only one leg known it is not possible to calculate the location of the apex point with desired accuracy. As we have also seen, the area around the apex usually is obscured by the much stronger signals coming from the pipes.

However, in these circumstances we can use the information about the distance to the pipes that is obtained from the type 1 signals, as discussed above. From these we can locate the spatial position of the annular area of the cement level as distance from the signal recorder along the vertical (i.e., distance from well center), but not the horizontal position (height). But by knowing one leg of the hyperbola we can by combining the two find the apex of the hyperbola and thus the location of the cement level boundary.

Figure 10:
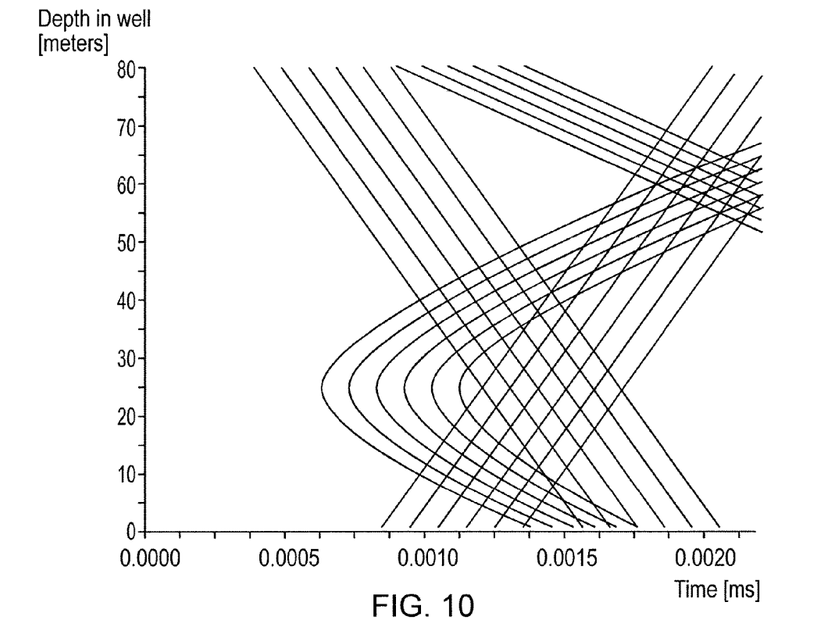
FIG. 10 illustrates reflected signals from several pulses after processing, where the theoretical waveforms from FIG. 9 are overlaid.

The picture shown in FIG. 10 represents exemplary signals received by the signal receiver when firing the pulse generator at different heights in a model of a well, wherein the cement/water boundary is present in the model of the well. Hence, the cement/water boundary is expected to be found, The received signals are placed into a two dimensional matrix where each element is a numerical value representing the strength of the signal. The columns are the vertical position in the well and the rows are the time delay value.

In FIG. 10, the theoretical hyperbolas are overlaid on the representation of the signals. It is still not possible to deduce any results from FIG. 10, as there is a lot of noise in this picture.

Figure 11:
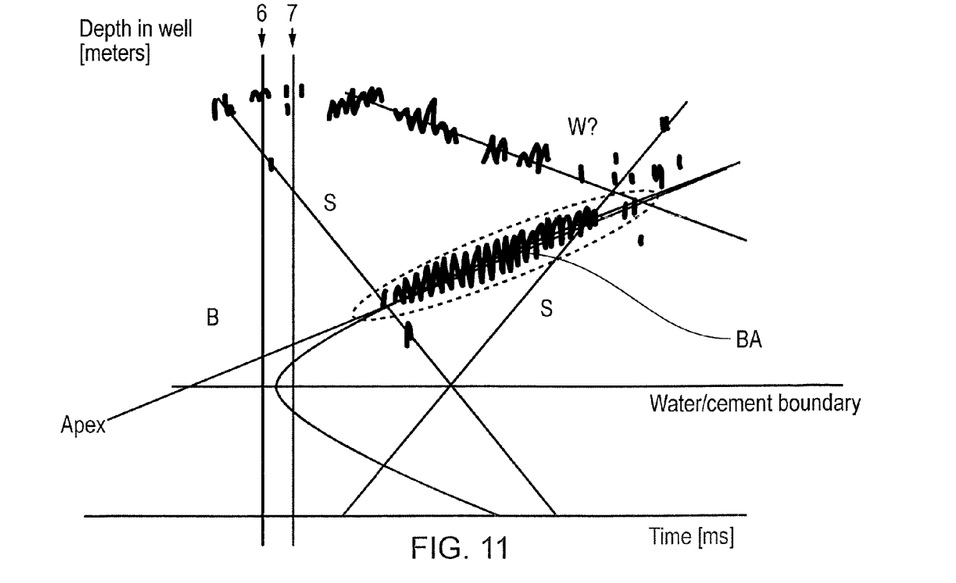
FIG. 11 illustrates how the cement level may be deduced from FIG. 10.

A filter may therefore be used on the signals illustrated in FIG. 10 in order to reduce noise. The result of the filtering process is shown in FIG. 11. In FIG. 11, a signal area BA is indicated by a dashed circle. This area is found to represent the apex of a part of the upper half section of the hyperbola B from FIG. 9. We also know the position of the area representing the space between the two pipes 6 and 7. Hence, by extrapolating the hyperbola B based on the signal area BA, the hyperbola B can be drawn as shown in FIG. 11.

The tip of the hyperbola (i.e. the horizontal line through the tip) represents the cement/water boundary.

It is important to note that the amplitude of this reflection very significantly depends on the position of a hydrophone relative to an inductor. This reflection is not very strong but due to its specific properties it can be reliably detected after the appropriate signal processing. Because of the numerous pipes that the waves will travel through there will be both first, second and third order reflections. As can be seen in FIGS. 8 and 9 there are very strong reflections coming from waves being reflected from above at an angle. Then there are similar waves being reflected from the bottom. As can be seen in the middle of the figure there are also waves being reflected back at a specific angle and these waves are the indicator of the presence of the cement level.

The invention claimed is:

1. A method for determining a position of a water/cement boundary in an annular area between first and second concentric pipes in a hydrocarbon well, the method comprising the steps of:
   a) running a well tool into a central pipe of the well which extends concentrically through both said first and second pipes, the well tool comprising a tool housing, a pulse generator provided within the tool housing, and a signal recorder provided within the tool housing;
   b) generating an electromagnetic pulse by means of the pulse generator to thereby create physical vibrations in the central pipe of the well;
   c) recording reflected acoustic signals from the well by means of the signal recorder;
   d) repeating steps b) and c) for different vertical positions of the pulse generator in the well;
   e) organizing the recorded signals in a two-dimensional representation;
   f) filtering the organized recorded signals in order to identify, in the two-dimensional representation, a hyperbola;
   g) designating an apex of the hyperbola as the determined position of the water/cement boundary.

2. The method according to claim 1, further comprising the step of computing a tip point of the hyperbola from a leg of the hyperbola and known positions of the first and second concentric pipes, wherein the tip point of the hyperbola represents the water/cement boundary.

3. The method according to claim 1, wherein the two-dimensional representation includes a two-dimensional matrix of the relationship between vertical position in the well and the time delay of the reflected acoustic signal.

4. The method according to claim 3, wherein each element of the matrix includes a numerical value representing a signal strength value of the recorded signals.

5. The method according to claim 4, wherein the matrix includes column positions corresponding to vertical positions in the well and row positions corresponding to acoustic time delay values.

6. The method according to claim 1, wherein the different vertical positions of step d) are separated by 3 cm-10 cm.

7. The method according to claim 1, wherein in the filtering step f) a filter is used to filter out signals with a direction of propagation that is perpendicular to an axis of the well tool.

* * * * *